(12) United States Patent
Indurkar

(10) Patent No.: US 10,939,297 B1
(45) Date of Patent: Mar. 2, 2021

(54) SECURE UNLOCK OF MOBILE PHONE

(71) Applicant: Sprint Communications Company L.P., Overland Park, KS (US)

(72) Inventor: Dhananjay Indurkar, Overland Park, KS (US)

(73) Assignee: T-MOBILE INNOVATIONS LLC, Overland Park, KS (US)

(*) Notice: Subject to any disclaimer, the term of this patent is extended or adjusted under 35 U.S.C. 154(b) by 306 days.

(21) Appl. No.: 16/144,924

(22) Filed: Sep. 27, 2018

(51) Int. Cl.
| | |
|---|---|
| H04W 12/08 | (2009.01) |
| H04L 9/32 | (2006.01) |
| H04L 9/30 | (2006.01) |
| H04L 9/08 | (2006.01) |
| H04W 12/04 | (2021.01) |
| H04L 29/06 | (2006.01) |
| H04W 88/02 | (2009.01) |

(52) U.S. Cl.
CPC .......... *H04W 12/08* (2013.01); *H04L 9/0869* (2013.01); *H04L 9/30* (2013.01); *H04L 9/3242* (2013.01); *H04L 9/3247* (2013.01); *H04L 63/10* (2013.01); *H04W 12/04* (2013.01); *H04W 88/02* (2013.01)

(58) Field of Classification Search
CPC ........ H04W 12/08; H04W 12/04; H04L 63/10
See application file for complete search history.

(56) References Cited

U.S. PATENT DOCUMENTS

| | | | | |
|---|---|---|---|---|
| 8,694,620 B2* | 4/2014 | Zhu | ...................... | H04L 67/125 |
| | | | | 709/224 |
| 8,938,232 B2* | 1/2015 | Manso | ..................... | H04W 8/18 |
| | | | | 455/432.1 |
| 9,198,045 B1* | 11/2015 | Ghoshal | .................. | H04W 4/50 |
| 9,319,884 B2* | 4/2016 | Buzescu | ................. | H04L 63/20 |
| 9,813,399 B2* | 11/2017 | Velusamy | ............... | H04W 8/22 |
| 10,171,649 B2* | 1/2019 | Karimli | ................ | H04B 1/3816 |
| 10,476,875 B2* | 11/2019 | Magadevan | ...... | H04W 12/0027 |
| 2005/0091367 A1* | 4/2005 | Pyhalammi | ........... | H04L 63/123 |
| | | | | 709/224 |
| 2008/0090614 A1* | 4/2008 | Sicher | ................... | H04W 8/205 |
| | | | | 455/558 |
| 2008/0209206 A1* | 8/2008 | Vaha-Sipila | ........ | H04L 63/0823 |
| | | | | 713/155 |
| 2010/0015949 A1* | 1/2010 | Bradley | ................ | H04W 88/06 |
| | | | | 455/410 |

(Continued)

*Primary Examiner* — James R Turchen

(57) ABSTRACT

A mobile communication device. The mobile communication device comprises a cellular radio transceiver, a radio modem communicatively comprising a radio modem processor, a radio modem non-transitory memory, and a security client application stored in the radio modem non-transitory memory. When executed by the radio modem processor, the security client application builds a device unlock request comprising an encrypted word, transmits the device unlock request via the cellular radio transceiver, receives a device unlock command via the cellular radio transceiver comprising a second encrypted word, decrypts the second encrypted word wherein the decryption of the second encrypted word comprises a digital signature, determines that the digital signature is valid, stores a device unlock state value in the radio modem non-volatile memory, and, configures a device unlocked policy into the radio modem, whereby the mobile communication device is configured to an international unlocked operation mode or a domestic unlocked operation mode.

14 Claims, 8 Drawing Sheets

(56) References Cited

U.S. PATENT DOCUMENTS

| | | | | |
|---|---|---|---|---|
| 2010/0169660 A1* | 7/2010 | Voss | ............... | H04W 12/00409 |
| | | | | 713/183 |
| 2011/0130117 A1* | 6/2011 | Fan | ................... | H04M 15/8038 |
| | | | | 455/411 |
| 2011/0130118 A1* | 6/2011 | Fan | ...................... | H04W 8/183 |
| | | | | 455/411 |
| 2011/0271330 A1* | 11/2011 | Zhang | ............... | H04W 12/0609 |
| | | | | 726/5 |
| 2012/0039213 A1* | 2/2012 | Cheng | ................... | H04W 76/12 |
| | | | | 370/254 |
| 2012/0210134 A1* | 8/2012 | Mitter | ................ | H04W 12/001 |
| | | | | 713/171 |
| 2013/0210389 A1* | 8/2013 | Obaidi | ................. | H04W 8/245 |
| | | | | 455/411 |
| 2013/0305047 A1* | 11/2013 | Xi | ........................ | H04L 63/083 |
| | | | | 713/168 |
| 2014/0155038 A1* | 6/2014 | Fan | ................... | H04M 15/8038 |
| | | | | 455/411 |
| 2016/0225002 A1* | 8/2016 | Splaine | ................... | H04L 67/02 |
| 2016/0234690 A1* | 8/2016 | Michalski | ......... | H04W 12/0802 |
| 2016/0255493 A1* | 9/2016 | Lihosit | ............... | H04L 41/0893 |
| | | | | 455/419 |
| 2016/0269448 A1* | 9/2016 | Jayaraman | ............ | H04L 63/306 |
| 2017/0288719 A1* | 10/2017 | Kovacevic | ............ | H04W 8/183 |
| 2017/0295168 A1* | 10/2017 | Wan | ................... | H04L 63/0876 |
| 2018/0013568 A1* | 1/2018 | Muhanna | .............. | H04L 9/0825 |
| 2018/0027405 A1* | 1/2018 | Holtmanns | ....... | H04W 12/0403 |
| | | | | 455/558 |
| 2018/0285602 A1* | 10/2018 | Mersh | ..................... | G06F 21/33 |
| 2018/0309754 A1* | 10/2018 | Magadevan | .......... | H04L 63/102 |
| 2019/0182734 A1* | 6/2019 | Laliberte | ............... | H04W 24/08 |
| 2020/0137567 A1* | 4/2020 | Karapantelakis | ... | H04L 63/0876 |

* cited by examiner

SECURE UNLOCK OF MOBILE PHONE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In the United States, mobile communication device purchases are often subsidized in part by wireless communication service providers in exchange for subscribers committing to maintaining service of a subscription account at least for a predefined time duration. The wireless communication service provider may attempt to enforce these agreements by locking the phone to their own radio access network (RAN). The mobile communication device may be configured in various ways to restrict the mobile communication to primary access (e.g., non-roaming access) exclusively to the service provider's RAN. In some cases, for example, when a subscriber visits a foreign country where the service provider does not operate a RAN, a wireless communication service provider may grant an international unlock state to the mobile communication device that allows the mobile communication device to attach to an RAN in the foreign country in a primary access mode (e.g., non-roaming access).

SUMMARY

In an embodiment, a mobile communication device is disclosed. The mobile communication device comprises a cellular radio transceiver and a radio modem communicatively coupled to the cellular radio transceiver. The radio modem comprises a radio modem processor, a radio modem non-transitory memory, and a security client application stored in the radio modem non-transitory memory. When executed by the radio modem processor, the security client application determines a current time, determines an identity of the mobile communication device, and generates an encrypted word by encrypting a combination of the current time and the identity of the mobile communication device using a public encryption key stored in the radio modem non-transitory memory. The security client application builds a device unlock request comprising the encrypted word and transmits the device unlock request via the cellular radio transceiver to an open mobile alliance device management (OMA-DM) server. The security client application receives a device unlock command via the cellular radio transceiver comprising a second encrypted word from the OMA-DM server, decrypts the second encrypted word using the public encryption key stored in the radio modem non-transitory memory, wherein the decryption of the second encrypted word comprises a digital signature associated with the OMA-DM server and a hash value, and generates a second hash value based on the identity of the mobile communication device. The security client application determines that the digital signature is valid, determines the second hash value matches the hash value, stores a device unlock state value in the radio modem non-volatile memory, and during an initialization of the security client application subsequent to a power-on event of the mobile communication device, configures a device unlocked policy into the radio modem, whereby the mobile communication device is configured to an international unlocked operation mode or a domestic unlocked operation mode.

In another embodiment, a method of unlocking a mobile communication device is disclosed. The method comprises determining an identity of the mobile communication device by the security client application, and generating an encrypted word by the security client application by encrypting the identity of the mobile communication device using a public encryption key associated with an open mobile alliance device management (OMA-DM) server stored in the radio modem non-transitory memory. The method further comprises transmitting the encrypted word by the security client application via the cellular radio transceiver to the OMA-DM server, receiving a device unlock command by the security client application via the cellular radio transceiver comprising a second encrypted word from the OMA-DM server, and decrypting the second encrypted word by the security client application using the public encryption key stored in the radio modem non-transitory memory, wherein the decryption of the second encrypted word comprises a digital signature associated with the OMA-DM server, a time-to-live value, and a hash value. The method further comprises determine that the time-to-live value has not expired, generating a second hash value by the security client application based on the identity of the mobile communication device, determining that the digital signature is valid by the security client application, and determining the second hash value matches the hash value by the security client application. The method further comprises storing a device unlock state value in the radio modem non-volatile memory by the security client application and, during an initialization of the security client application subsequent to a power-on event of the mobile communication device, configuring a device unlocked policy into the radio modem by the security client application, whereby the mobile communication device is configured to an international unlocked operation mode or an international and domestic unlocked operation mode.

In yet another embodiment, a method of unlocking a mobile communication device is disclosed. The method comprises receiving an unlock request from a mobile communication device by a server application executing on an open mobile alliance device management (OMA-DM) server, wherein the unlock request comprises an encrypted word, decrypting the encrypted word by the server application using a private encryption key associated with the OMA-DM server, wherein the decryption of the encrypted word comprises a nonce value and an identity of the mobile communication device, and accessing subscription account information associated with the mobile communication device by the server application based on the identity of the mobile communication device. The method further comprises determining by the server application that a subscription account of the mobile communication device is in good standing, determining by the server application that the subscription account of the mobile communication device is eligible for the requested unlock, and generating by the server application a hash value based on the nonce value and the identity of the mobile communication device by the mobile communication device. The method further comprises encrypting the hash value in a second encrypted word using the private encryption key associated with the OMA-DM server by the server application and transmitting the second encrypted word by the server application in an unlock command message to the mobile communication device, whereby the mobile communication device is configured to an international unlocked operation mode or an international and domestic unlocked operation mode.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
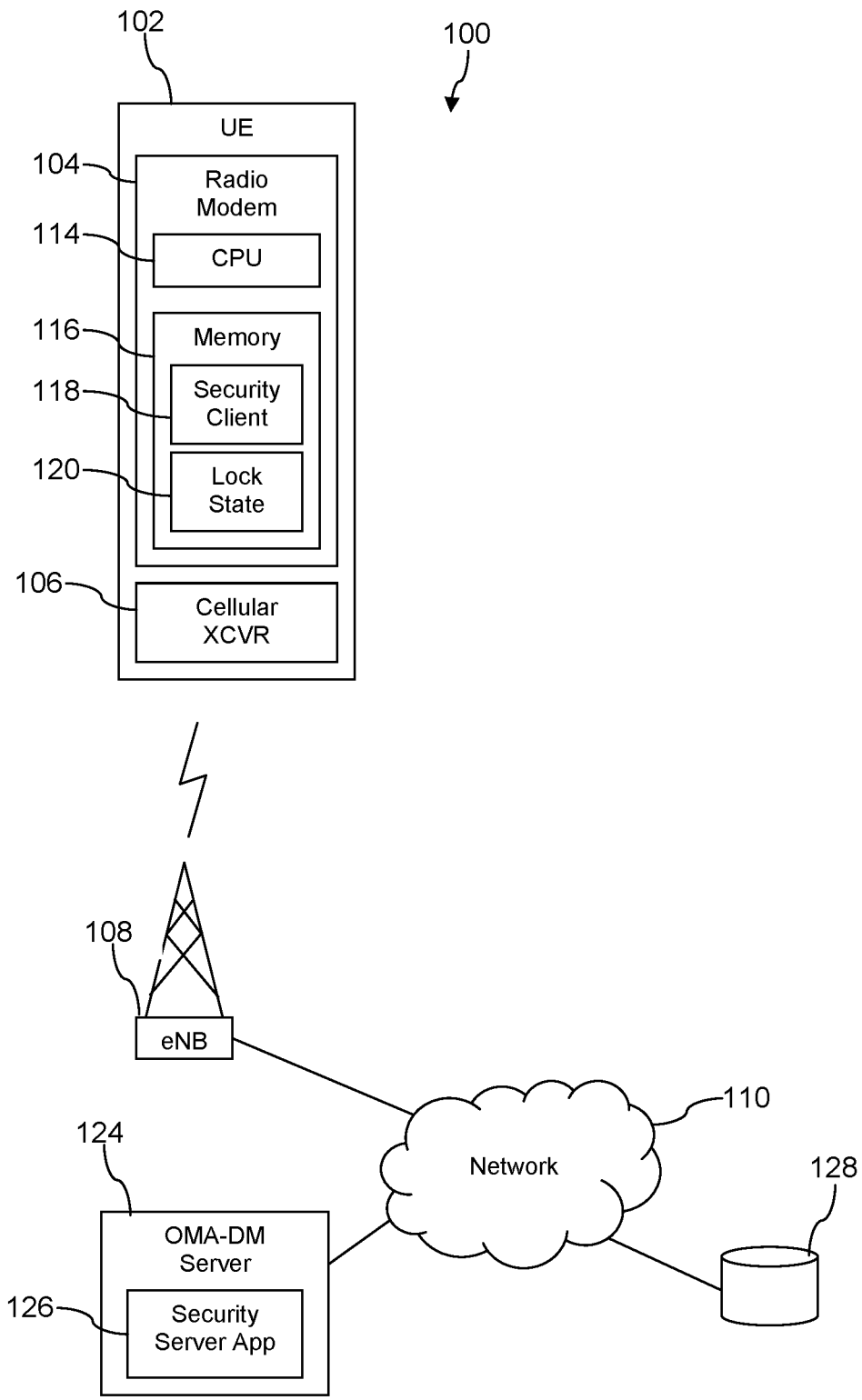
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A costly form of fraud consists in persons obtaining a subsidized mobile communication device that is locked to a service provider radio access network (RAN), tampering with the device to unlock it, and then abrogating their service plan agreement with the service provider. The disclosure describes a security client application (e.g., firmware) that is installed in and executes on a radio modem of the mobile communication device that controls the unlock process. Firmware in the radio modem is protected from modification by strict access controls that reduce the mobile communication device's risk of being fraudulently unlocked. When a request to unlock the mobile communication device is input to the device, the security client application sends an unlock request to a security server application. When an unlock authorization is received from the security server application, the security client application validates the unlock authorization and unlocks the device. The device may be unlocked for use on a RAN outside of the United States (e.g., an international unlock) or may be unlocked for use on any RAN (e.g., an international and domestic unlock).

When a request to unlock the mobile communication device is received by the security client application (e.g., from a user interface of the mobile communication device), the client encrypts information specific to the device in an encrypted word. The information that is encrypted may comprise one or more of an identity of the device, an identity of the original equipment manufacturer (OEM) of the device, an identity of a make and model of the device, a random number (e.g., a nonce) generated by the security client application, or a current time or time-to-live. In an embodiment, the random number may be stored and on the mobile communication device and encrypted using an encryption key provided by an original equipment manufacturer (OEM) of the mobile communication device. This encrypted random number is then used in the unlock transaction. The security client application encrypts this information using a pubic encryption key associated with the security server application and stored in the radio modem at the time of manufacture by the OEM.

The security client application sends the encrypted word in an unlock request message to the security server application executing on a server. The unlock request message may identify whether an international unlock is requested or an international and domestic unlock is requested. The security server application receives the unlock request message, decrypts the encrypted word using a private encryption key associated with the security server application, and looks up wireless communication service subscription account information in a data store, for example using the identity of the device. If there is no subscription account associated with the device, the security server application terminates processing the unlock request message and does not return a reply to the security client application. If there is a current time or time-to-live value in the unlock request message, the server application determines if the unlock request message is too old or if its time-to-live value has expired, and if it is expired terminates processing the unlock request message and does not return a reply to the security client application. If there is a subscription account associated with the device but the subscription account is not in good standing (e.g., the account is in arrears, the subscriber has been cited for violating boundaries of a service usage agreement, or the subscriber has engaged in a pattern of behaviors that are associated with fraud), the security server application terminates processing the unlock request message and does not return a reply to the security client application.

If there is a subscription account associated with the device and it is in good standing, the security server application determines whether the mobile communication device is eligible for an unlock. If the mobile communication device was purchased with a subsidy and the associated subscription account has been kept in good standing for the predefined duration of time prescribed in the device purchase agreement (e.g., has fulfilled the purchase subsidy time constraints), the device is permitted to undergo both international unlock and international and domestic unlock. If the mobile communication device has not fulfilled the purchase subsidy time constraint but an international unlock is requested, the device is permitted to undergo an international unlock. If an unlock is permitted, the security server application encrypts information in a second encrypted word using a private encryption key associated with the security server application, where the information comprises one or more of the identity of the mobile communication device, the random number (e.g., nonce) received in the unlock request message, a digital certificate associated with the security server application, or a time-to-live value or an indication of current time and date. In an embodiment, the random number received in the unlock request is hashed by the security server application before it is encrypted. The security server application sends an unlock command message that identifies what kind of unlock is authorized, an international unlock or an international and domestic unlock, and that includes the second encrypted word to the security client application.

The security client application receives and parses the unlock command message and then decrypts the second encrypted word using the public encryption key associated with the security server application. The security client application validates that the unlock command message was sent by the security server application, for example by validating the digital certificate of the security server application and/or by determining that the random number sent in the second encrypted word agrees with the random number sent in the encrypted word in the unlock request message sent by the security client application. If the random number was encrypted using the OEM encryption key, the security client application decrypts the encrypted random number received from the security server application in the unlock command message and compares it to the stored random number. In an embodiment, the security server application hashes the random number before it is encrypted into the second encrypted word, and the security client application hashes the random number it generated and compares its hash with the received hash to validate, at least in part, that the unlock command message was sent by the security server application. If the digital certificate is not validated, if the random number in the second encrypted word does not agree with the random number sent in the encrypted word by the security client application, or if the two hashes do not match, the unlock command may have been sent by a hacker, and the security client application may compose a report on such validation failures and send the validation failure reports to the security server application for analysis to support fraud mitigation activities. The security client application may add information such as current location when the validation failure occurred into the validation failure report. If a time-to-live or a current date and time is sent in the second encrypted word, the security client application determines whether the unlock command message is expired. If the unlock command message is expired, the unlock operation is not completed.

If the unlock command message is validated (and the unlock command was not deemed expired), the security client application stores an indication of lock state of the mobile communication device in the radio transceiver. The lock state may be (1) locked, (2) international unlocked, or (3) international and domestic unlocked. When the mobile communication device is powered on, the radio transceiver initiation firmware reads the lock state and generates and promulgates a lock policy on the mobile communication device that controls the locked versus unlocked behavior of the mobile communication device.

In an embodiment, an international unlock may be implemented with a time constraint such that after the time associated with the time constraint is exceeded, the international unlock is removed and the device is returned to the locked state by the security client application. In this embodiment, a time of initiation of international unlock may be stored in the memory of the radio modem. The security client application may periodically execute and evaluate the time elapsed since the time international unlock was initiated relative to the international unlock time constraint, and if the elapsed time exceeds the international unlock time constraint, the security client application returns the device to the locked state. In this case, the security client application may force the mobile communication device into a power cycle or reboot to cause the lock policy to be revised and promulgated within the mobile communication device. An international unlock time constraint may be about 20 days, about 30 days, about 45 days, after about 60 days, or some other number of days. In an embodiment, the international unlock time constrain may be configured into the security client application. In another embodiment, the international unlock time constraint may be defined by the server application and encapsulated in the unlock command sent by the server application to the security client application.

The security client application and security server application described above and further hereinafter provide solutions rooted in computer technology to a significant and costly fraud problem experienced by many US wireless communication service providers. This computer technology solution effectively reduces the capability of fraudsters to unfairly benefit from device purchase subsidies commonly provided by US wireless communication service providers while at the same time enabling legitimate wireless communication service subscribers in good standing the opportunity to unlock their mobile communication devices either temporarily or permanently. In another benefit of this computer technology solution, the service subscriber in good standing is enabled to serve themselves to initiate and complete unlock of their mobile communication device (provided they are qualified for unlock) on their own initiative, without the inconvenience of waiting in an interactive voice response (IVR) system or working with a customer care representative.

Tuning now to FIG. 1, a communication system 100 is described. In an embodiment, the system 100 comprises a mobile communication device (user equipment: UE) 102 having a radio modem 104 and a cellular radio transceiver 106 that is configured to establish a wireless communication link with a cell site 108. The cell site 108 may communicatively couple the mobile communication device 102 to a network 110. The cell site 108 provides the wireless communication link to the cellular radio transceiver 106 according to one of a long term evolution (LTE), a code division multiple access (CDMA), a global system for mobile communications (GSM), or a worldwide interoperability for microwave access (WiMAX) wireless communication protocol. The network 110 is one or more private networks, one or more public networks, or a combination thereof. The mobile communication device 102 is one of a mobile phone, a smart phone, a personal digital assistant (PDA), a wearable computer, a headset computer, a laptop computer, a tablet computer, or a notebook computer. The mobile communication device 102 may access the network 110 via the cell site 108, for example, to complete voice calls, to access content on internet web sites, or to establish a communication session with an application server connected to the network 110.

The radio modem 104 comprises a processor 114 and a memory 116. A non-volatile memory portion of the memory 116 stores a security client application 118 and a lock state 120 (e.g., a parameter value, a data value). In an embodiment, the radio modem 104 is an integrated circuit. In an embodiment, the security client application 118 is implemented as firmware. Access to change firmware and data stored in the memory 116 of the radio modem 104 may be restricted. For example, users may be forbidden to write to the memory 116 in the radio modem 104. Such access restrictions may be enforced by an operating system or other resource management facility executing on the radio modem 104 that requires access keys be provided to access the memory 116 of the radio modem 104, for example to write to the memory 116 of the radio modem 104. The access keys to gain access to write to the memory 116 of the radio modem 104 may be known only to the OEM and/or to a mobile communication service provider (e.g., a wireless carrier). The security client application 118 may be referred to as OEM installed firmware. The security client application 118 is permitted to write to the memory 116 of the radio modem 104, for example to write to the lock state 120 in the memory 116 of the radio modem 104.

The mobile communication device 102 may present a user interface to a user that allows the user to request that the mobile communication device 102 be unlocked (either international unlock or international and domestic unlock). This user input is provided to the security client application 118 that executes on the processor 114 of the radio modem 104. The security client application 118 may send an unlock request message via the cellular transceiver 106, via the cell site 108, via the network 110, to a security server application 126 executing on a server computer, for example executing on an open mobile alliance device management (OMA-DM) server computer 124. The security server application 126 may look up subscriber account information in a subscriber account data store 128 that is associated with the mobile communication device 102 based on information provided by the security client application 118 (e.g., a device identity) in the unlock request message. The security server application 126 determines if the mobile communication device 102 is eligible to be unlocked based on the looked-up subscriber account information. The security server application 126 may send an unlock authorization message to the security client application 118 via the network 110, via the cell site 108, to the cellular transceiver 106. The security client application 118 may, in response to receiving and validating the unlock authorization message, set the lock state 120 to a different value, for example changing a locked value to an international unlock value or to an international and domestic unlock value. When the mobile communication device 102 is powered on and the radio modem 104 initiates, the value in the lock state 120 is evaluated and used to generate and propagate a lock policy within the mobile communication device 102. In this way, the phone can become unlocked only through the intermediary of the security client application 118 requesting an unlock and receiving an unlock authorization from the OMA-DM server 124.

Figure 2A:
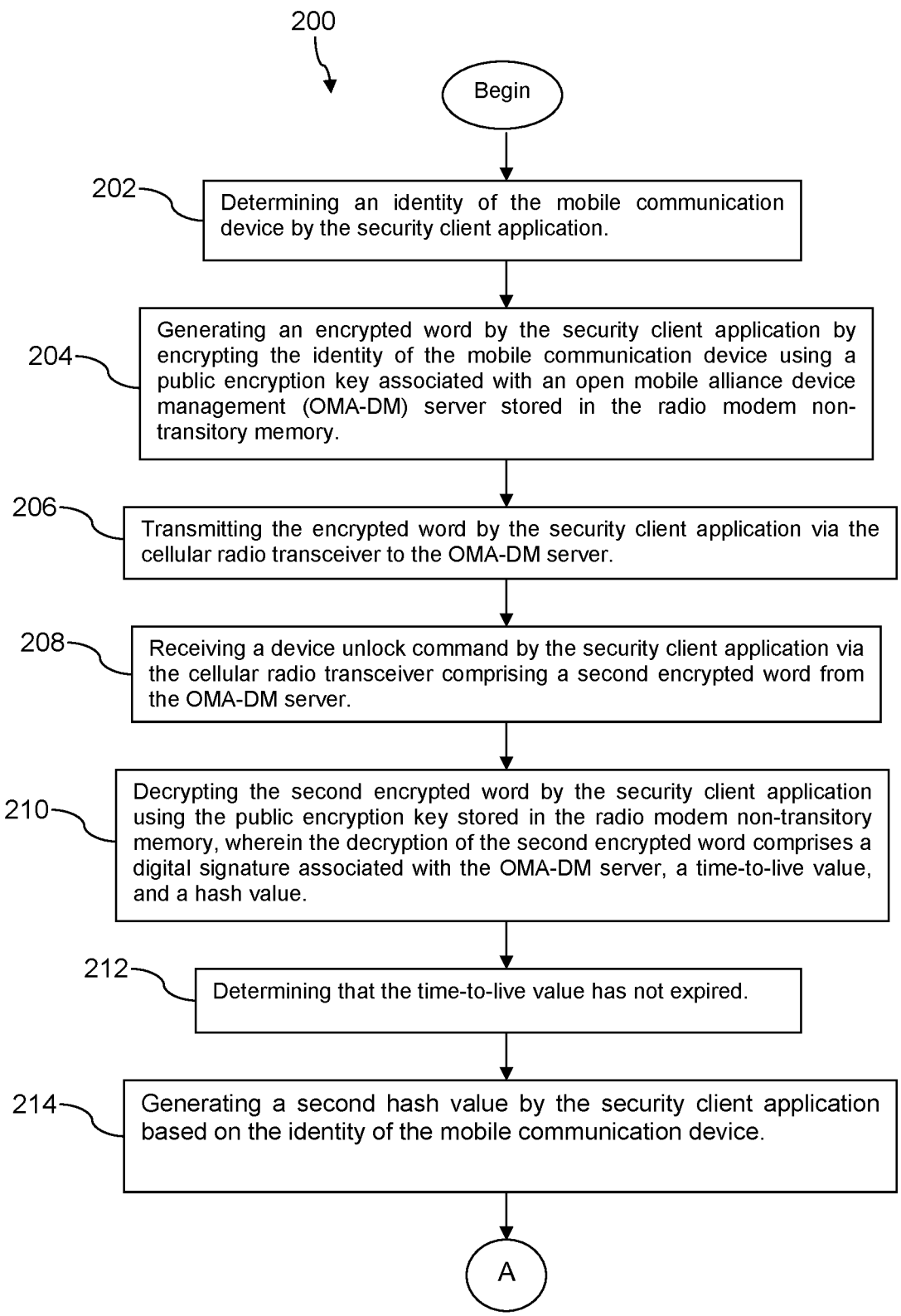
FIG. 2A and FIG. 2B is a flow chart of a method according to an embodiment of the disclosure.
Figure 2B:
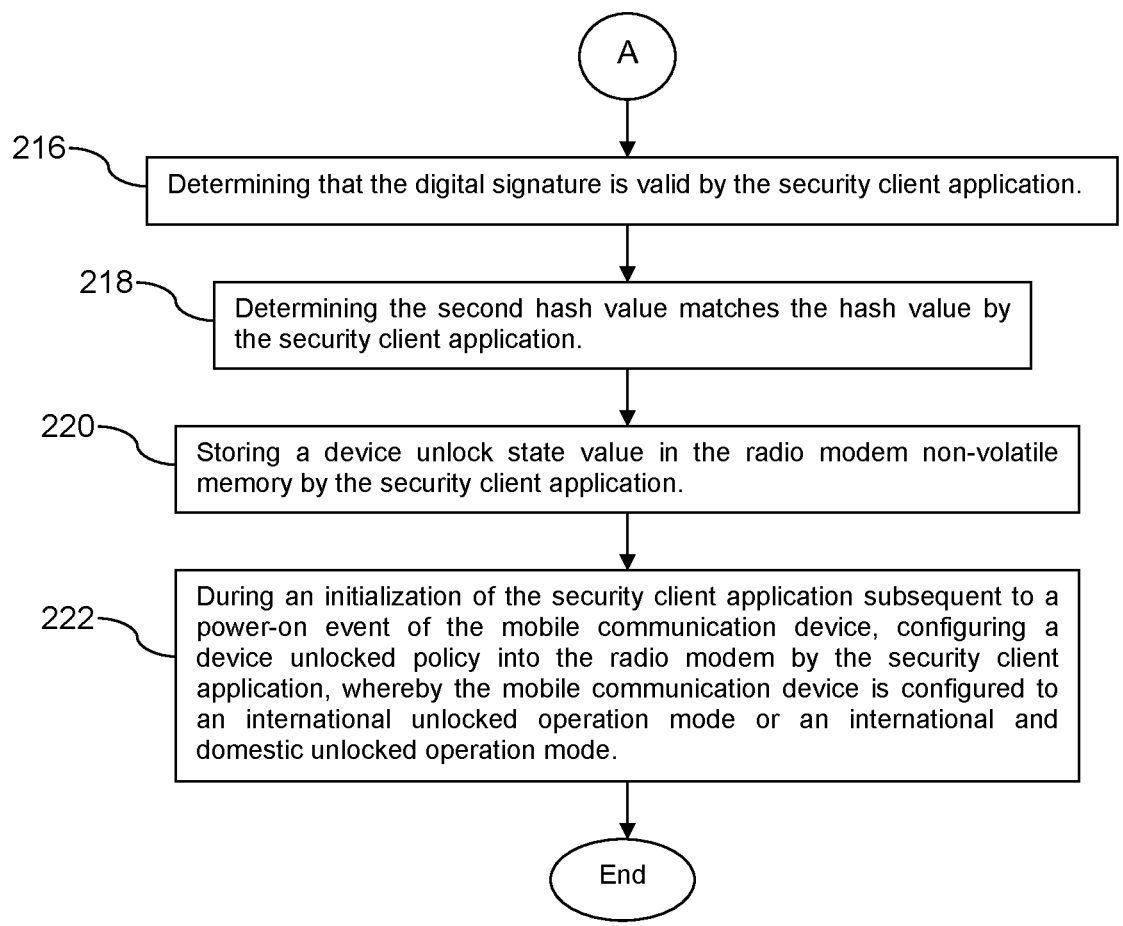

Turning now to FIG. 2A and FIG. 2B, a method 200 of unlocking a mobile communication device is described. In an embodiment, the processing of method 200 may be initiated or triggered by a user inputting an unlock request into the mobile communication device and that input propagating to the security client application 118 executing on the processor 114 of the radio modem 104.

At block 202, the method 200 comprises determining an identity of the mobile communication device by the security client application. The security client application may invoke an operating system (OS) call to determine the identity of the mobile communication device. The identity of the mobile communication device may be a mobile equipment identity (MEID), an integrated circuit card identity (ICCID) associated with a SIM card of the mobile communication device, an international mobile subscriber identity (IMSI), a mobile station ISDN number (MSISDN), or another identity.

At block 204, the method 200 comprises generating an encrypted word by the security client application by encrypting the identity of the mobile communication device using a public encryption key associated with an open mobile alliance device management (OMA-DM) server stored in the radio modem non-transitory memory. Alternatively, the security client application may encrypt the identity of the mobile communication device using a different encryption key. In an embodiment, the security client application may encrypt additional information in combination with the identity of the mobile communication device, for example one or more of a current time or a time-to-live value (e.g., a time-to-live of an unlock request message), an identity of an OEM, or an identity of a make and model of the mobile communication device.

At block 206, the method 200 comprises transmitting the encrypted word by the security client application via the cellular radio transceiver to the OMA-DM server. The encrypted word may comprise an indication of what kind of unlock is requested—an international unlock or an international and domestic unlock. At block 208, the method 200 comprises receiving a device unlock command by the security client application via the cellular radio transceiver comprising a second encrypted word from the OMA-DM server.

At block 210, the method 200 comprises decrypting the second encrypted word by the security client application using the public encryption key stored in the radio modem non-transitory memory (or using a different encryption key), wherein the decryption of the second encrypted word comprises a digital signature associated with the OMA-DM server and a hash value. At block 212, the decryption of the second encrypted word may comprise additional information, for example a time-to-live value or a current date and time. If the security client application determines that the device unlock command is expired based on the time-to-live value or based on comparing a current date and time to the current date-and time provided in the second encrypted word, the security client application stops processing method 200 and does not change the lock state of the mobile communication device.

At block 214, the method 200 comprises determining that the time-to-live value has not been expired. If the time-to-live value in the second encrypted word (e.g., the received unlock command) is expired, the processing of method 200 terminates. At block 214, the method 200 comprises generating a second hash value by the security client application based on the identity of the mobile communication device. The hash value in the second encrypted word may have been hashed by the OMA-DM server using a hashing algorithm. At block 216, the method 200 comprises determining that the digital signature is valid by the security client application. In an embodiment, the digital signature may be decrypted by the security client application using the public encryption key or another encryption key to obtain information identifying the OMA-DM server. If the digital signature is not valid, the security client application stops the processing of method 200 and does not change the lock state of the mobile communication device.

At block 218, the method 200 comprises determining the second hash value matches the hash value by the security client application. If the hash values do not match, the security client application stops processing method 200 and does not change the lock state of the mobile communication device. At block 220, the method 200 comprises storing a device unlock state value in the radio modem non-volatile memory by the security client application. The unlock state value may be an international unlock state value or an international and domestic unlock state value. The unlock state value may be indicated in the unlock command message received from the OMA-DM server. At block 222, the method 200 comprises, during an initialization of the security client application subsequent to a power-on event of the mobile communication device, configuring a device unlocked policy into the radio modem by the security client application, whereby the mobile communication device is configured to an international unlocked operation mode or an international and domestic unlocked operation mode.

In an embodiment, the unlock command message may indicate that the unlock to be performed is an international unlock. The security client application may switch the lock state to international unlock temporarily and reset the lock state to locked after passage of a predefined interval of time, for example, after about 20 days, after about 30 days, after about 45 days, or after about 60 days. When the lock state is initially changed to international unlock, the security client application may store a date and time value in the memory of the radio modem and periodically evaluate whether the predefined interval of time has expired by comparing a current date and time to the date and time stored in the memory of the radio modem. If the temporary international unlock has expired, the security client application may reset the lock state to locked and cause the mobile communication device to power cycle. Alternatively, the security client application may rese the lock state to locked and generate and propagate a new lock policy to the mobile communication device.

Figure 3:
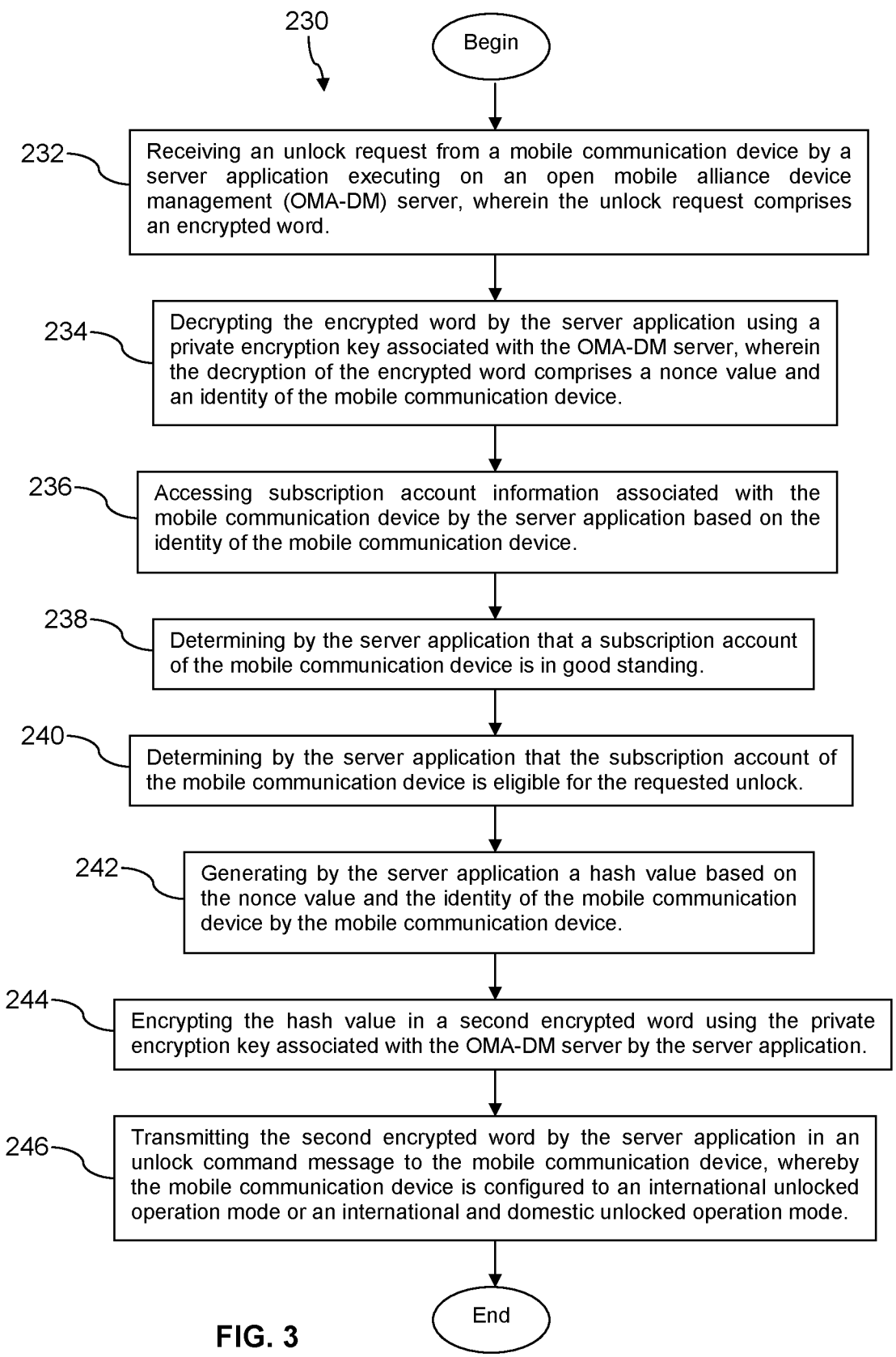
FIG. 3 is a flow chart of another method according to an embodiment of the disclosure.

Turning now to FIG. 3, a method 230 of unlocking a mobile communication device is described. At block 232, the method 230 comprises receiving an unlock request from a mobile communication device by a server application executing on an open mobile alliance device management (OMA-DM) server, wherein the unlock request comprises an encrypted word. In an embodiment, the unlock request indicates a type of unlock requested, for example one of an international unlock request or an international and domestic unlock request. At block 234, the method 230 comprises decrypting the encrypted word by the server application using a private encryption key associated with the OMA-DM server, wherein the decryption of the encrypted word comprises a nonce value and an identity of the mobile communication device. In alternative embodiment, the server application decrypts the encrypted word using a different encryption key.

At block 236, the method 230 comprises accessing subscription account information associated with the mobile communication device by the server application based on the identity of the mobile communication device. For example, the security server application 126 reads subscriber account information out of the subscription account data store 128. At block 238, the method 230 comprises determining by the server application that a subscription account of the mobile communication device is in good standing. The server application may determine if the subscription account is paid up to date. The server application may determine if the subscription account has been flagged or otherwise denoted as demonstrating a behavior pattern that correlates with fraud activities. If the subscription account is not in good standing or if the subscription account has been flagged or denoted as demonstrating a behavior pattern that correlates with fraud activities, the server application may discontinue the processing of method 230 and not transmit an unlock command message to the mobile communication device.

At block 240, the method 230 comprises determining by the server application that the subscription account of the mobile communication device is eligible for the requested unlock. For example, the server application may determine if the duration of time since the mobile communication device 102 was purchased is equal to or greater than a purchase subsidy time constraint agreed to by the subscriber when purchasing the phone. If the subscription account is not eligible for the requested unlock, the server application may discontinue the processing of method 230 and not transmit an unlock command message to the mobile communication device. Alternatively, if the type of unlock requested is an international unlock, the subscriber need not have fulfilled the purchase subsidy time constraint agreed to by the subscriber. At block 242, the method 230 comprises generating by the server application a hash value based on the nonce value and/or the identity of the mobile communication device by the mobile communication device.

At block 244, the method 230 comprises encrypting the hash value in a second encrypted word using the private encryption key associated with the OMA-DM server by the server application. The server application may also encrypt a time-to-live or a current date and time value in the second encrypted word. At block 246, the method 230 comprises transmitting the second encrypted word by the server application in an unlock command message to the mobile communication device, whereby the mobile communication device is configured to an international unlocked operation mode or an international and domestic unlocked operation mode. In an embodiment, the processing of method 230 may be performed on a different server computer that is not an OMA-DM server.

Figure 4:
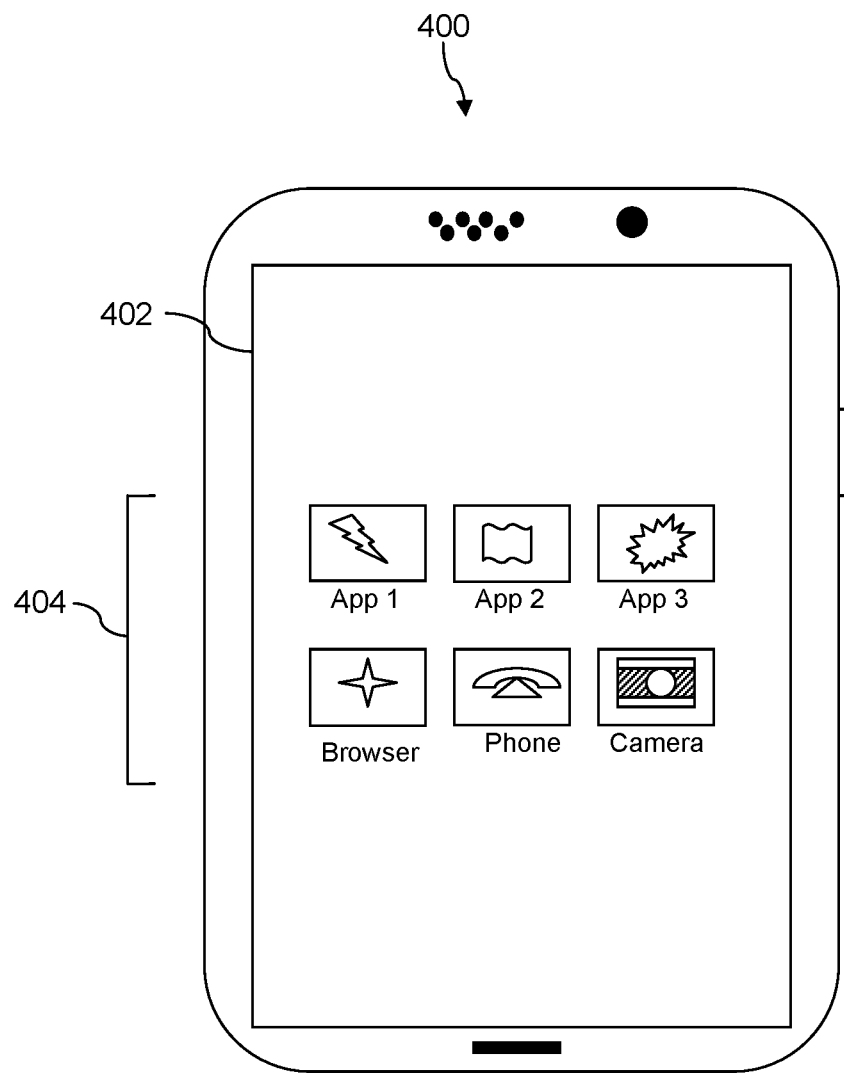
FIG. 4 is an illustration of a mobile communication device according to an embodiment of the disclosure.

FIG. 4 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
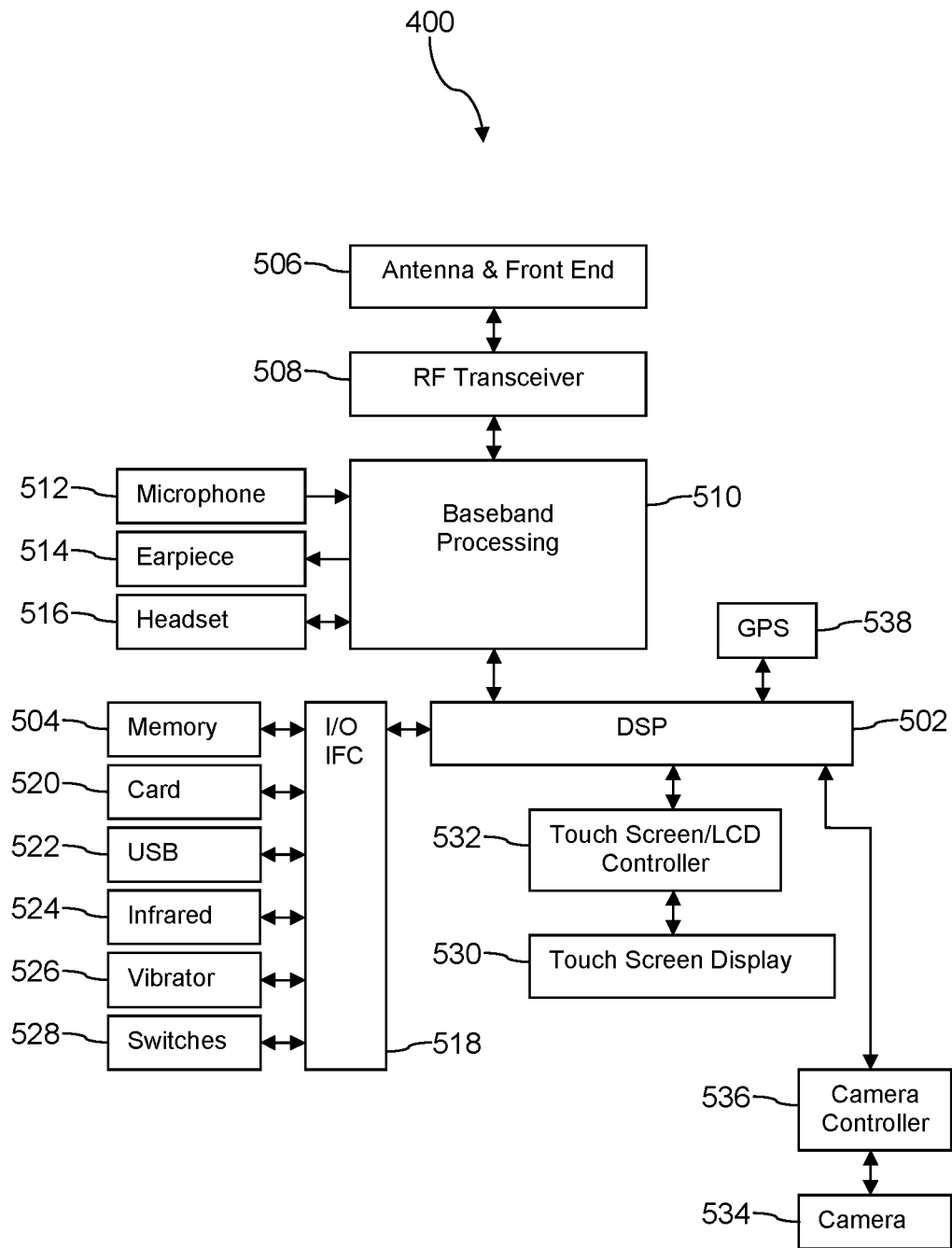
FIG. 5 is a block diagram of a hardware architecture of a mobile communication device according to an embodiment of the disclosure.

FIG. 5 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. The base band processing unit 510 may be substantially similar to the radio modem 104 described above with reference to FIG. 1. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 6A:
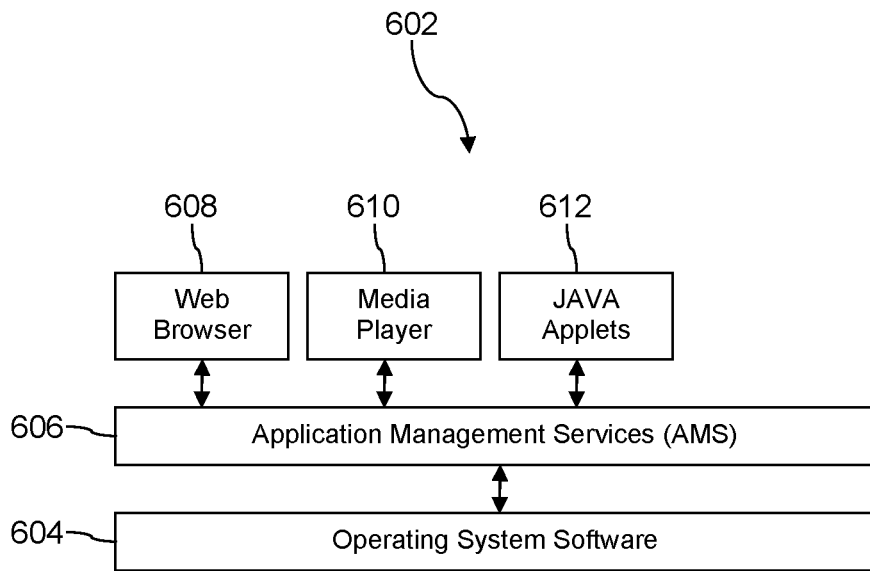
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 6B:
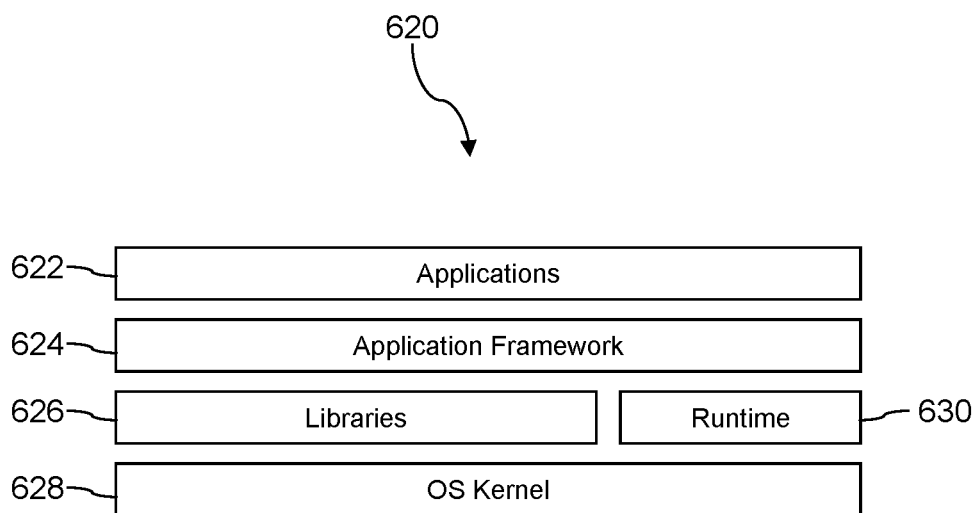
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
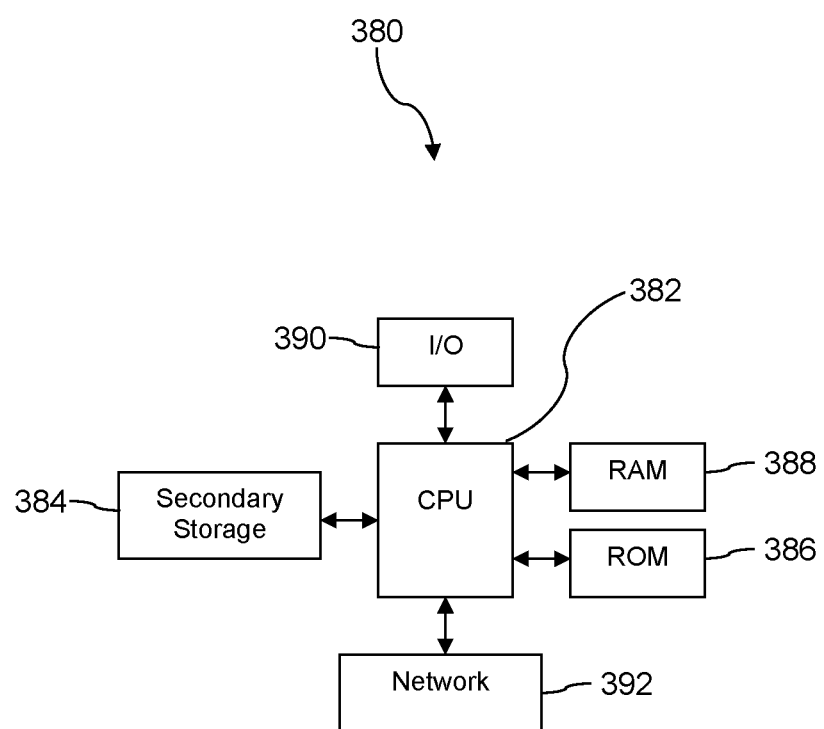
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), world-wide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:
1. A mobile communication device, comprising:
a cellular radio transceiver;
a radio modem communicatively coupled to the cellular radio transceiver comprising:
  a radio modem processor,
  a radio modem non-transitory memory, and
  a security client application stored in the radio modem non-transitory memory that, when executed by the radio modem processor:
    generates a random number,
    determines a current time,
    determines an identity of the mobile communication device,
    generates an encrypted word by encrypting the random number in combination with the current time and the identity of the mobile communication device using a public encryption key stored in the radio modem non-transitory memory,
    builds a device unlock request comprising the encrypted word,
    transmits the device unlock request via the cellular radio transceiver to an open mobile alliance device management (OMA-DM) server,
    receives a device unlock command via the cellular radio transceiver comprising a second encrypted word from the OMA-DM server,
    decrypts the second encrypted word using the public encryption key stored in the radio modem non-transitory memory, wherein the decryption of the second encrypted word comprises a digital signature associated with the OMA-DM server and a hash value,
    generates a second hash value based on the random number and the identity of the mobile communication device,
    determines that the digital signature is valid,
    determines the second hash value matches the hash value,
    stores a device unlock state value in the radio modem non-volatile memory, and
    during an initialization of the security client application subsequent to a power-on event of the mobile communication device, configures a device unlocked policy into the radio modem, whereby the mobile communication device is con- figured to an international unlocked operation mode or a domestic unlocked operation mode.

2. The mobile communication device of claim 1, wherein the radio modem is an integrated circuit.

3. The mobile communication device of claim 1, wherein the mobile communication device is one of a mobile phone, a smart phone, a personal digital assistant (PDA), a wearable computer, a headset computer, a laptop computer, a tablet computer, or a notebook computer.

4. The mobile communication device of claim 1, wherein the decryption of the second encrypted word further comprises one of a time-to-live value or a current date and time and wherein the security client application further determines that the device unlock command is not expired.

5. The mobile communication device of claim 1, wherein the security client application further monitors a duration of time that passes after storing an international unlock state value in the radio modem non-volatile memory and stores a locked state value in the radio modem non-volatile memory after passage of a predefined period of time in the international unlock state.

6. The mobile communication device of claim 1, wherein the device unlock command indicates one of an international unlock or an international and domestic unlock.

7. A method of unlocking a mobile communication device, comprising:
 generating a random number by a security client application on the mobile communication device;
 determining a current time by the security client application;
 determining an identity of the mobile communication device by the security client application;
 generating an encrypted word by the security client application by encrypting the random number in combination with the current time and the identity of the mobile communication device using a public encryption key associated with an open mobile alliance device management (OMA-DM) server stored in the radio modem non-transitory memory;
 transmitting the encrypted word by the security client application via the cellular radio transceiver to the OMA-DM server;
 receiving a device unlock command by the security client application via the cellular radio transceiver comprising a second encrypted word from the OMA-DM server;
 decrypting the second encrypted word by the security client application using the public encryption key stored in the radio modem non-transitory memory, wherein the decryption of the second encrypted word comprises a digital signature associated with the OMA-DM server, a time-to-live value, and a hash value;
 determining that the time-to-live value has not expired;
 generating a second hash value by the security client application based on the random number and the identity of the mobile communication device;
 determining that the digital signature is valid by the security client application;
 determining the second hash value matches the hash value by the security client application;
 storing a device unlock state value in the radio modem non-volatile memory by the security client application; and
 during an initialization of the security client application subsequent to a power-on event of the mobile communication device, configuring a device unlocked policy into the radio modem by the security client application, whereby the mobile communication device is configured to an international unlocked operation mode or an international and domestic unlocked operation mode.

8. The method of claim 7, wherein the decryption of the second encrypted word comprises a time-to-live value, and further comprising determining that the device unlock command received from the OMA-DM server is not expired based on comparing a current time to the time-to-live value.

9. The method of claim 7, wherein the identity of the mobile communication device is designated as a mobile equipment identity (MEID), an integrated circuit card identity (ICCID) associated with a SIM card of the mobile communication device, an international mobile subscriber identity (IMSI), or a mobile station ISDN number (MSISDN).

10. The method of claim 7, wherein the device unlock command indicates an international unlock or an international and domestic unlock, further comprising when the unlock command indicates an international unlock, monitoring a duration of time that passes after storing an international unlock state value in the radio modem non-volatile memory and storing a locked state value in the radio modem non-volatile memory after passage of a predefined period of time in the international unlock state.

11. The method of claim 10, wherein the predefined period of time is 30 days.

12. The method of claim 7, wherein the mobile communication device is one of a mobile phone, a smart phone, a personal digital assistant (PDA), a wearable computer, a headset computer, a laptop computer, a tablet computer, or a notebook computer.

13. The method of claim 7, further comprising:
 receiving an unlock request from the mobile communication device by a server application executing on the OMA-DM server, wherein the unlock request comprises the encrypted word;
 decrypting the encrypted word by the server application using a private encryption key associated with the OMA-DM server, wherein the decryption of the encrypted word comprises the random number and the identity of the mobile communication device;
 accessing subscription account information associated with the mobile communication device by the server application based on the identity of the mobile communication device;
 determining by the server application that a subscription account of the mobile communication device is in good standing;
 determining by the server application that the subscription account of the mobile communication device is eligible for the requested unlock;
 generating by the server application the hash value based on the random number and the identity of the mobile communication device;
 encrypting the hash value in the second encrypted word using the private encryption key associated with the OMA-DM server by the server application; and
 transmitting the second encrypted word by the server application in the device unlock command to the mobile communication device.

14. The method of claim 13, wherein the decryption of the encrypted word further comprises a date and time, further comprising determining if the unlock request has expired based on comparing the date and time stored in the decryption of the encrypted word to a current date and time.

* * * * *